(12) United States Patent
Ullrich

(10) Patent No.: US 11,353,585 B2
(45) Date of Patent: Jun. 7, 2022

(54) RANGE FINDING METHOD

(71) Applicant: RIEGL LASER MEASUREMENT SYSTEMS GMBH, Horn (AT)

(72) Inventor: Andreas Ullrich, Gablitz (AT)

(73) Assignee: RIEGL Laser Measurement Systems GmbH, Horn (AT)

(*) Notice: Subject to any disclaimer, the term of this patent is extended or adjusted under 35 U.S.C. 154(b) by 833 days.

(21) Appl. No.: 16/313,229

(22) PCT Filed: May 10, 2017

(86) PCT No.: PCT/EP2017/061172
§ 371 (c)(1),
(2) Date: Dec. 26, 2018

(87) PCT Pub. No.: WO2018/007053
PCT Pub. Date: Jan. 11, 2018

(65) Prior Publication Data
US 2019/0162851 A1 May 30, 2019

(30) Foreign Application Priority Data
Jul. 6, 2016 (EP) .................................... 16178128

(51) Int. Cl.
*G01S 17/00* (2020.01)
*G01S 17/10* (2020.01)
*G01S 17/42* (2006.01)
*G01S 7/487* (2006.01)
(Continued)

(52) U.S. Cl.
CPC .............. *G01S 17/10* (2013.01); *G01S 7/487* (2013.01); *G01S 7/4865* (2013.01); *G01S 13/20* (2013.01);
(Continued)

(58) Field of Classification Search
USPC ....................................................... 356/5.01
See application file for complete search history.

(56) References Cited

U.S. PATENT DOCUMENTS

| 4,688,044 A | 8/1987 | O'Brien |
| 4,954,830 A | 9/1990 | Krikorian et al. |

(Continued)

FOREIGN PATENT DOCUMENTS

JP 60218087 10/1985

OTHER PUBLICATIONS

P. Webb et al., "Suppression of second-time-around echoes in high firing rate ultrasonic transducers," NDT&E International, vol. 28, No. 2, pp. 89-93, 1995.
(Continued)

*Primary Examiner* — James R Hulka
(74) *Attorney, Agent, or Firm* — Hoffmann and Baron, LLP

(57) ABSTRACT

The present disclosed subject matter relates to a method for measuring the distance of targets in the surroundings by way of a time-of-flight measurement of pulses reflected at said targets, in particular laser pulses, said method comprising: emitting a sequence of transmission pulses having varying pulse intervals, and receiving at least one receive pulse after each one of two different transmission pulses; for each receive pulse: generating a group of M candidate distances, each based on a different transmission pulse among M transmission pulses preceding the receive pulse, wherein each candidate distance is assigned to the corresponding transmission pulse on which it is based; for each candidate distance: determining a weighting value on the basis of at least the closest of the candidate distances assigned to such a transmission pulse which is adjacent to the transmission pulse to which the candidate distance being considered in this determining process is assigned; for each group: selecting the candidate distance with the highest weighting value as the distance measurement value of the receive pulse for which the group was generated.

15 Claims, 7 Drawing Sheets

(51) Int. Cl.
    *G01S 17/89* (2020.01)
    *G01S 13/20* (2006.01)
    *G01S 13/22* (2006.01)
    *G01S 7/4865* (2020.01)
    *G01S 7/484* (2006.01)

(52) U.S. Cl.
    CPC ............ *G01S 13/225* (2013.01); *G01S 17/42* (2013.01); *G01S 17/89* (2013.01); *G01S 7/484* (2013.01)

(56) References Cited

U.S. PATENT DOCUMENTS

| | | | | |
|---|---|---|---|---|
| 8,885,890 B2* | 11/2014 | Tardif | ................... | G06T 5/002 |
| | | | | 382/106 |
| 2006/0109161 A1* | 5/2006 | Krikorian | ........... | G01S 13/9019 |
| | | | | 342/25 R |
| 2010/0245162 A1* | 9/2010 | Krikorian | ................ | G01S 7/28 |
| | | | | 342/202 |
| 2011/0267223 A1* | 11/2011 | Jin | ........................ | G01S 7/2923 |
| | | | | 342/137 |
| 2017/0322298 A1* | 11/2017 | Beitelspacher | ......... | G01S 13/22 |

OTHER PUBLICATIONS

International Search Report from corresponding PCT application published as WO2018/007053.

English translation of the International Preliminary Report on Patentability from corresponding PCT application published as WO2018/007053.

* cited by examiner

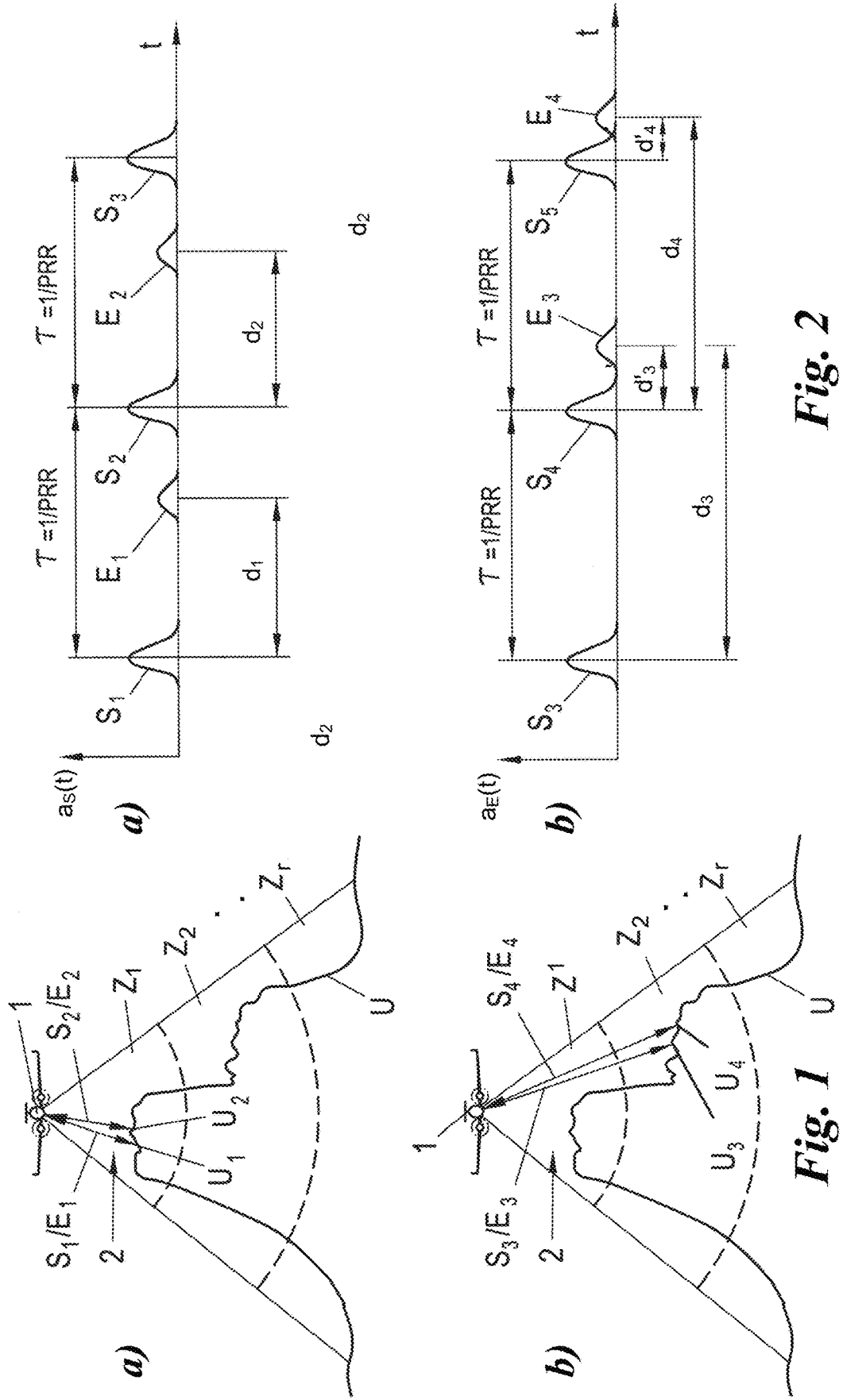

RANGE FINDING METHOD

CROSS-REFERENCE TO RELATED APPLICATIONS

This application is a National Phase application of International Application No. PCT/EP2017/061172 filed May 10, 2017 which claims priority to the European Patent Application No. 16178128.1 filed Jul. 6, 2016, the disclosures of which are incorporated herein by reference.

TECHNICAL FIELD

The present disclosed subject matter relates to a method for measuring the distance of targets in the surroundings by way of a time-of-flight measurement of pulses reflected at said targets. The pulses can be of any type, for example light pulses, in particular laser pulses, radio pulses, in particular radar pulses, sound pulses, or the like. The disclosed subject matter also relates to a method for laser scanning by continuously directing laser pulses towards different targets in the surroundings.

BACKGROUND

Modern pulse time-of-flight rangefinders, such as laser rangefinders or scanners, work with high pulse power over large distances and/or high pulse repetition rates in order to quickly create a number of distance measurement points in the surroundings. In both cases the situation can arise that the next pulse is already emitted before the reflection of the last pulse has been received, so that the incoming received pulses can no longer be clearly assigned to their corresponding transmission pulse. This is known as a "multiple time around" (MTA) or "multiple pulses in the air" problem. The maximum size $d_{max}$ of the distance range that can be measured reliably, or what is known as the MTA zone, is given here from the pulse repetition rate (PRR) and the light speed c on the following basis:

$$d_{max} = \frac{1}{2} \cdot \frac{c}{PRR} \quad (1)$$

Laser scanners of modern design for example offer pulse repetition rates of up to 1200 kHz, which corresponds to an MTA zone size $d_{max}$ of approximately 125 m. If this measurement distance is exceeded, the measurement result generally cannot be correctly interpreted on account of the fact that the transmission and receive pulses cannot be assigned clearly to one another.

FIGS. 1 and 2 show this situation in detail. A pulsed laser measurement beam 2 is guided in a sweeping manner, for example from an airborne laser scanner 1, for example in rows in a fan-shaped manner over a surroundings area U with individual targets in the surroundings (scanning points) $U_1$, $U_2$, etc. The distances $d_1$, $d_2$, etc. of the individual targets $U_1$, $U_2$, etc. in the surroundings are determined from time-of-flight measurements on the individual emitted pulses $S_1$, $S_2$, etc., which are retrieved after the reflection at the surroundings as received pulses $E_1$, $E_2$, etc.

FIGS. 1a and 2a show an exemplary situation when measuring targets in the surroundings $U_1$, $U_2$ which are disposed in the first MTA zone $Z_1$ closest to the laser scanner 1. The receive pulse $E_1$ belonging to the transmission pulse $S_1$ is retrieved before the next transmission pulse $S_2$ is emitted at the time interval $\tau=1/PRR$, and so on and so forth.

FIGS. 1b and 2b show an exemplary situation when targets in the surroundings $U_3$, $U_4$ are disposed in the second MTA zone $Z_2$. Here, the receive pulse $E_3$ belonging to the transmission pulse $S_3$ is received only once the next transmission pulse $S_2$ has already been emitted. In order to determine the correct distance $d_3$ of the target in the surroundings $U_3$ in the zone $Z_2$ it is necessary to assign the receive pulse $E_3$ correctly to the transmission pulse $S_3$; if the receive pulse $E_3$ is incorrectly assigned to the directly preceding transmission pulse $S_2$, an incorrect target distance $d_3'$ results in the incorrect MTA zone $Z_1$, instead of the correct target distance $d_3$ in the correct MTA zone $Z_2$.

A wide range of different methods are known for mutual MTA-zone-correct assignment of the transmission and receive pulses and thus surmounting of the MTA zone limits for clear distance measurement results; see for example patents AT 510.296, AT 511.310 and AT 515.214 by the same applicant.

BRIEF SUMMARY

The objective of the disclosed subject matter is to further improve the known methods such that they deliver correct distance measurement values also in difficult target situations, such as multiple reflections of a single transmission pulse at targets in the surroundings in different MTA zones or in the case of MTA-zone-breaching jumps in distance in the surroundings to be measured.

This objective is achieved in accordance with the disclosed subject matter by a method for measuring the distance of a target in the surroundings by measuring the time-of-flight of pulses reflected by said target, in particular laser pulses, said method comprising:

emitting a sequence of transmission pulses having varying pulse intervals, and receiving at least one receive pulse after each one of two different transmission pulses;

for each receive pulse: generating a group of M candidate distances, each based on a different transmission pulse among M transmission pulses preceding the receive pulse, wherein each candidate distance is assigned to the corresponding transmission pulse on which it is based;

for each candidate distance: determining a weighting value on the basis of at least the closest one of the candidate distances assigned to such a transmission pulse which is adjacent to the transmission pulse to which the candidate distance being considered in this determining process is assigned;

for each group: selecting the candidate distance with the highest weighting value as the distance measurement value of the receive pulse for which the group was generated.

The method according to the disclosed subject matter is based on a novel weighting analysis of multiple distance measurement value candidates, referred to here as "candidate distances" for short, which have each been calculated in respect of different preceding transmission pulses of a pulse-position-modulated transmission pulse sequence. The weighting analysis is able to create a highly reliable estimation of the respective MTA-zone-correct distance measurement value for each receive pulse. The method of the disclosed subject matter also delivers excellent MTA zone assignment results even in multi-target situations, in which one transmission pulse results in a plurality of receive pulses, because each receive pulse can be evaluated separately.

A particularly advantageous embodiment of the disclosed subject matter is characterised in that the transmission pulses are emitted with substantially identical amplitude, and for each receive pulse the amplitude thereof is also recorded, and in that the weighting value is formed at least from a distance weight based on the distance difference between the candidate distance under consideration and said closest candidate distance, and an amplitude weight based on the amplitude difference between the amplitude of that receive pulse for which the group comprising the candidate distance under consideration was generated and the amplitude of that other receive pulse for which the group comprising said closest candidate distance was generated.

Amplitude values of the receive pulses are thus used for the first time for the MTA-zone assignment or resolution. This is based on the assumption that, for targets in the surroundings with approximately identical reflectivity, receive pulses of targets arranged at a further distance in the surroundings have a lower amplitude than receive pulses of targets arranged closer in the surroundings. By calculating a weighting value for the pairings of candidate distances under consideration for each possible candidate distance based on both the distance difference and the amplitude difference, the distance information hidden in the amplitude of the receive pulses is utilised as additional information for the MTA zone resolution. As a result, the method provides robust, reliable MTA zone assignment results and therefore correct distance measurement values, even in difficult target situations, such as multiple reflections, rapidly changing MTA-zone-breaching jumps in distance in the surroundings, or the like.

The distance and amplitude differences can be weighted in the weighting values for their part in a wide range of different ways so as to produce different response behaviour of the method with respect to multiple reflections and distance jumps. It may be provided that the distance difference is incorporated non-linearly into the distance weight, wherein a greater distance different results in an underproportionately smaller distance weight, and the amplitude difference is incorporated non-linearly into the amplitude weight, wherein a greater amplitude difference results in an underproportionately smaller amplitude weight, which results in a particularly robust response behaviour unsusceptible to interference.

In accordance with a first variant of the method, in the aforementioned determining of the weighting value the adjacent transmission pulse is a temporally adjacent transmission pulse. Here, for the weighting value of a candidate distance, optionally a plurality of other candidate distances are taken into consideration on the basis of a plurality of adjacent transmission pulses, more specifically such other candidate distances that are assigned to the transmission pulses directly preceding and directly subsequent in the transmission pulse sequence. The direct temporal proximity of the transmission pulse causal for a receive pulse for the MTA zone assignment is thus examined, which implements the assumption that generally a plurality of successive transmission pulses contact targets in the same MTA zone. Optionally, precisely one temporally preceding and one temporally subsequent transmission pulse and the candidate distances assigned thereto are examined for distance proximity to the respective candidate distance to be weighted and are used for the weighting, i.e. two candidate distance pairings are weighted per candidate distance.

In accordance with an alternative variant of the method according to the disclosed subject matter for scanning a surroundings area in which the transmission pulses are emitted in their temporal sequence to locally different targets in the surroundings, in the aforementioned determining of the weighting value the adjacent transmission pulse is a transmission pulse locally adjacent in respect of the targets in the surroundings. This embodiment takes into account the fact that, when scanning a surroundings area, transmission pulses temporally successive in the transmission pulse sequence do not necessarily occur locally adjacently in the surroundings, for example if laser pulses are guided in a manner scanning the surroundings in rows with a polygon deflection mirror. Laser pulses occurring locally adjacently in the surroundings can, rather, also originate from transmission pulses which are not directly successive in the transmission pulse sequence, but instead are successive for example at a distance from a scanning row or scanning period. The term "adjacent" transmission pulse is understood accordingly in the present description as a comprehensive term for the two variants of a temporally adjacent transmission pulse or a locally adjacent transmission pulse.

In the latter variant a plurality of transmission pulses locally adjacent to the transmission pulse of the candidate distance to be weighted are optionally used for the determining of the weighting value. To this end, the weighting value is formed from partial weights, wherein each partial weight is based on the closest one of the candidate distances assigned to the respective locally adjacent transmission pulse. The partial weights are then summed for example to give the weighting value, and the candidate distance weighted in this way thus takes into consideration the local impingement surroundings so to speak of its original transmission pulse for the MTA zone resolution.

In this embodiment as well, a significant increase in the accuracy of the MTA zone assignment and thus robustness and precision of the distance measurement method can be attained if on the precondition that the transmission pulses are emitted with substantially the same amplitude and for each receive pulse the amplitude thereof is also recorded the aforesaid partial weights are composed again from a distance weight and an amplitude weight. In this way the amplitude of the receive pulses is utilised for the first time for the MTA zone assignment of the receive pulses under consideration of the local impingement surroundings of each transmission pulse. This embodiment also is based on the knowledge that adjacent transmission pulses impinging on a target usually experience the same reflectivity, and therefore valuable additional information for the MTA zone resolution can be obtained from the amplitude of the receive pulses.

The distance and amplitude differences in the partial weights of the weighting value can be provided again with corresponding non-linear weighting functions in order to increase the robustness of the method.

In accordance with a further optional feature of the disclosed subject matter, in each of the mentioned embodiments when determining the weighting value only those closest candidate distances that lie within a predefined distance range around the considered candidate distance can optionally also be taken into consideration, which saves computing time when calculating the weighting values.

The number M of candidate distances of a group which is generated for a receive pulse defines the number of possible MTA zones which can be assigned ("resolved") with the method. When generating a group, the M candidate distances are optionally based on M transmission pulses directly preceding the receive pulse, whereby M MTA zones directly adjacent to the emission location of the transmission pulses can be measured and resolved.

For the correct assignment (resolution) of M MTA zones it is sufficient if, during emission, the pulse distances are varied in accordance with a repeating code, the code length of which is greater than or equal to M. For example, a variation of the pulse intervals which is repeated after every 7 pulse intervals, i.e. a code of code length 7, is thus sufficient for the resolution of 7 MTA zones.

BRIEF DESCRIPTION OF THE DRAWINGS

The disclosed subject matter will be explained in greater detail hereinafter on the basis of exemplary embodiments illustrated in the accompanying drawings. In the drawings:

FIG. 1 schematically shows various reflection situations of a pulsed laser scanning beam at targets in the surroundings which lie in various MTA zones, according to the prior art;

FIG. 2 shows exemplary time graphs of transmission and receive pulses for the reflection situations of FIG. 1, according to the prior art;

DETAILED DESCRIPTION

Figure 3:
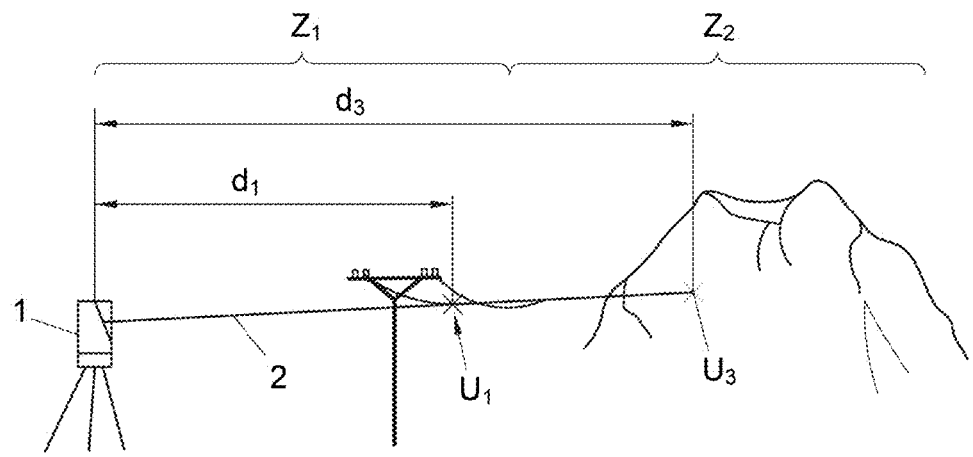
FIG. 3 shows a multi-target situation in a schematic perspective view.

FIGS. 1 and 2 show the pulse assignment problem of MTA-zone-exceeding distance measurement or scanning regions already explained in the introduction. This problem is intensified in what are known as multi-target situations according to FIG. 3, where a single transmission pulse is reflected by a plurality of targets $U_1$, $U_3$ in the surroundings arranged one after the other, possibly also in different MTA zones $Z_1$, $Z_2$. A transmission pulse $S_1$ of the laser measurement beam 2 considered to be representative experiences for example a first reflection at a close target $U_1$ in the first MTA zone $Z_1$, for example a power line, foliage or the like, which it merely brushes against, or a semi-transparent intermediate target, such as a cloud, a glass pane, etc.; and a second reflection at a distant target $U_3$ in the same or a different MTA zone, here the second MTA zone $Z_2$. The laser scanner 1 in such a situation receives, for the transmission pulse $S_1$, two receive pulses $E_1$, $E_3$. In the case of foliage, woods, etc. three, four or more receive pulses $E_i$ can also be received per transmission pulse $S_p$ (i, p∈N). If the laser rangefinder or scanner 1 is able to record and process more than one receive pulse $E_i$ per transmission pulse $S_p$, in particular also between two transmission pulses $S_p$, it is referred to as "multi-target-enabled". It is evident that the correct MTA zone assignment of a receive pulse $E_i$ in a multi-target-enabled rangefinder or scanner is much more difficult than as shown in FIGS. 1 and 2.

In order to solve the stated MTA zone assignment problem, the method described now with reference to FIGS. 4 to 10 is used. The method will be described on the basis of a multi-target-enabled laser scanner, although this is not absolutely necessary. The method can thus also be used for automatic MTA zone assignment ("MTA resolution") in laser scanners that are not multi-target-enabled, that is to say also in simple laser rangefinders for which the transmission pulses are not scanned over the surroundings, but are directed continuously towards the same target in the surroundings. Lastly, the described method is suitable not only for distance measurements by measuring the time-of-flight of laser pulses, but also of any pulses, whether these be radio pulses, in particular radar pulses, sound or sonar pulses, electrical pulses over electrical lines, for example for line length measurement, etc.

Figure 4:
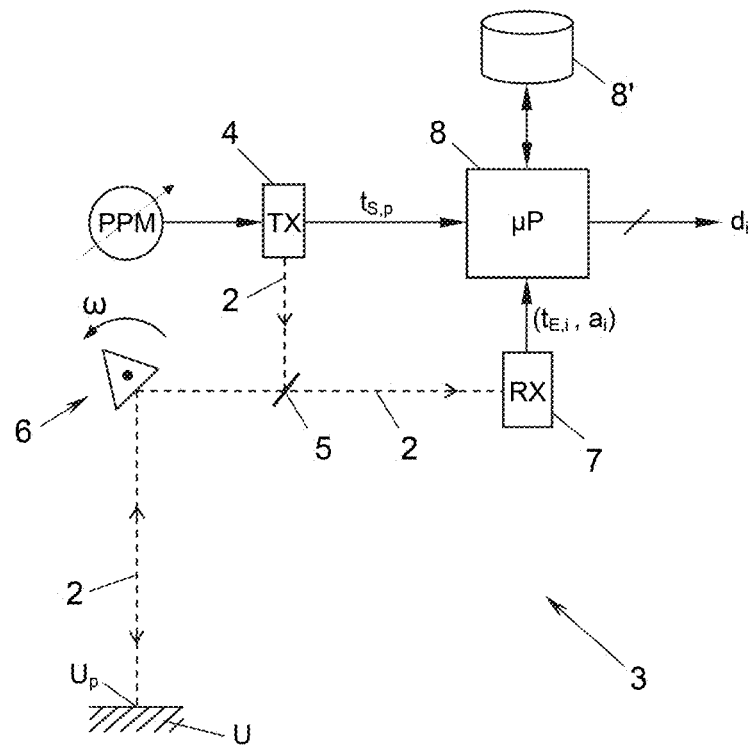
FIG. 4 shows a schematic block diagram of a laser scanner for carrying out the method of the disclosed subject matter.
Figure 5:
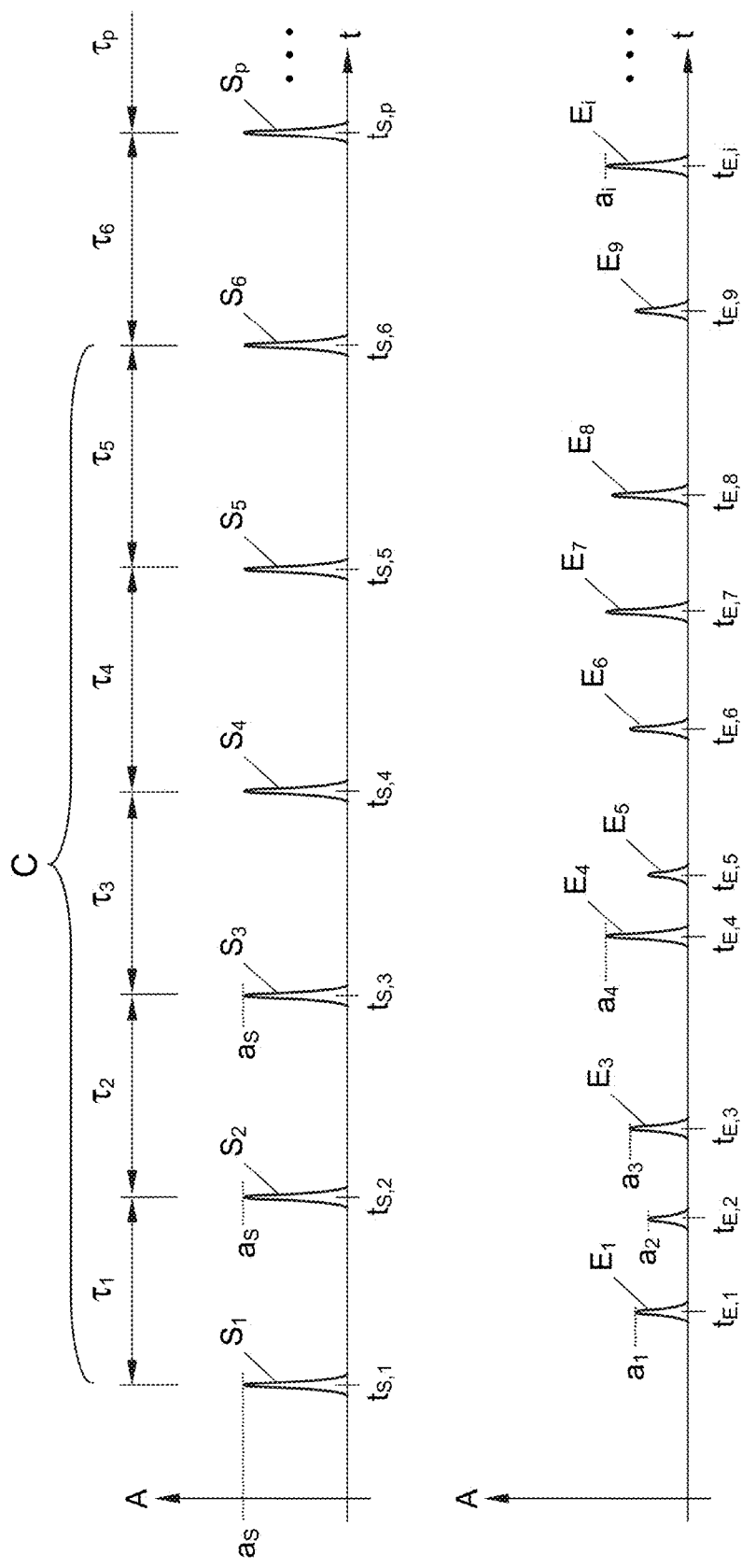
FIG. 5 shows exemplary time graphs of transmission and receive pulses within the scope of the method of the disclosed subject matter.

As shown in FIG. 4 and the upper graph of FIG. 5, a multi-target-enabled laser scanner 3 transmits transmission pulses $S_1$, $S_2$, etc., generally $S_p$, with a substantially constant amplitude $a_s$ at successive transmission times $\tau_{S,1}$, $\tau_{S,2}$, etc., generally $\tau_{S,p}$, by means of a laser transmitter 4. The pulse intervals $\tau_1 = \tau_{S,2} - \tau_{S,1}$, $\tau_2 = \tau_{S,3} - \tau_{S,2}$, generally $\tau_p = \tau_{S,p+1} - \tau_{S,p}$, of the transmission pulses $S_p$, vary from pulse to pulse, more specifically either randomly or, in particular, in accordance with a repeating pattern or "code" C with a pattern or code length L. In the shown example the code length is L=5, i.e. after five different pulse intervals $\tau_1$, $\tau_2$, $\tau_3$, $\tau_4$, TS the sixth pulse interval $\tau_6$ is the same again as the first pulse interval $\tau_1$, and so on and so forth. A pulse interval variation of this kind is also referred to as pulse position modulation (PPM) inasmuch as the individual pulse positions (transmission times) $t_{S,p}$ are "pulse-position-modulated" in their time position relative to the cycle of a constant pulse repetition rate (PRR=1/τ with the code C).

The transmission pulses $S_p$ are guided over the surroundings U from the laser transmitter 4 via a semi-permeable mirror 5 and a deflection device 6, for example a rotating polygon mirror wheel, as laser measurement beam 2 oscillating to and fro, and are reflected there by a target $U_p$ in the surroundings and are guided back again via the deflection device 6 to the semi-permeable mirror 5, pass through this and impinge on a laser receiver 7. The laser receiver 7 detects each incoming receive pulse $E_i$ and measures the receive time $t_{E,i}$ and amplitude $a_i$ thereof. In the lower graph of FIG. 5 a sequence of such receive pulses $E_i$ is shown by way of example with their receive times $t_{E,i}$ and amplitudes $a_i$.

Both the transmission times $\tau_{S,p}$ of the transmission pulses $S_p$ and the 2-tuple ($t_{E,i}$, $a_i$) of receive times $t_{E,i}$ and amplitudes $a_i$ of the receive pulses $E_1$ are supplied to a processor 8 and are stored thereby for example in a memory 8'. The processor 8 with use of the subsequently described method by MTA-zone-correct assignment of each receive pulse $E_i$ or 2-tuple ($t_{E,i}$, $a_i$) to the transmission pulse $S_p$ or transmission time $t_{S,p}$ causal therefor calculates the time of flight $$\Delta T_i = t_{S,p} - t_{E,i} \quad (2)$$

and on this basis, as is known, the distance $$d_i = \Delta T_i \cdot c/2. \quad (3)$$

Since the times of flight $\Delta T_i$ and the distance measurement values $d_i$ of the targets in the surroundings are proportional to one another, times of flight and distances in the present description are also used synonymously and exchangeably.

In order to assign each receive pulse $E_i$ the "correct" causal transmission pulse $S_p$ for the distance measurement, or conversely to determine for a transmission pulse $S_p$ the "correct" receive pulse or—in multi-target situations—receive pulses $E_i$ from the sequence of receive pulses $\{E_i\}$ and on this basis ultimately the correct distance measurement value $d_i$ for each target in the surroundings $U_p$, the processor 8 performs the method described with reference to FIGS. 6 to 9.

Figure 6:
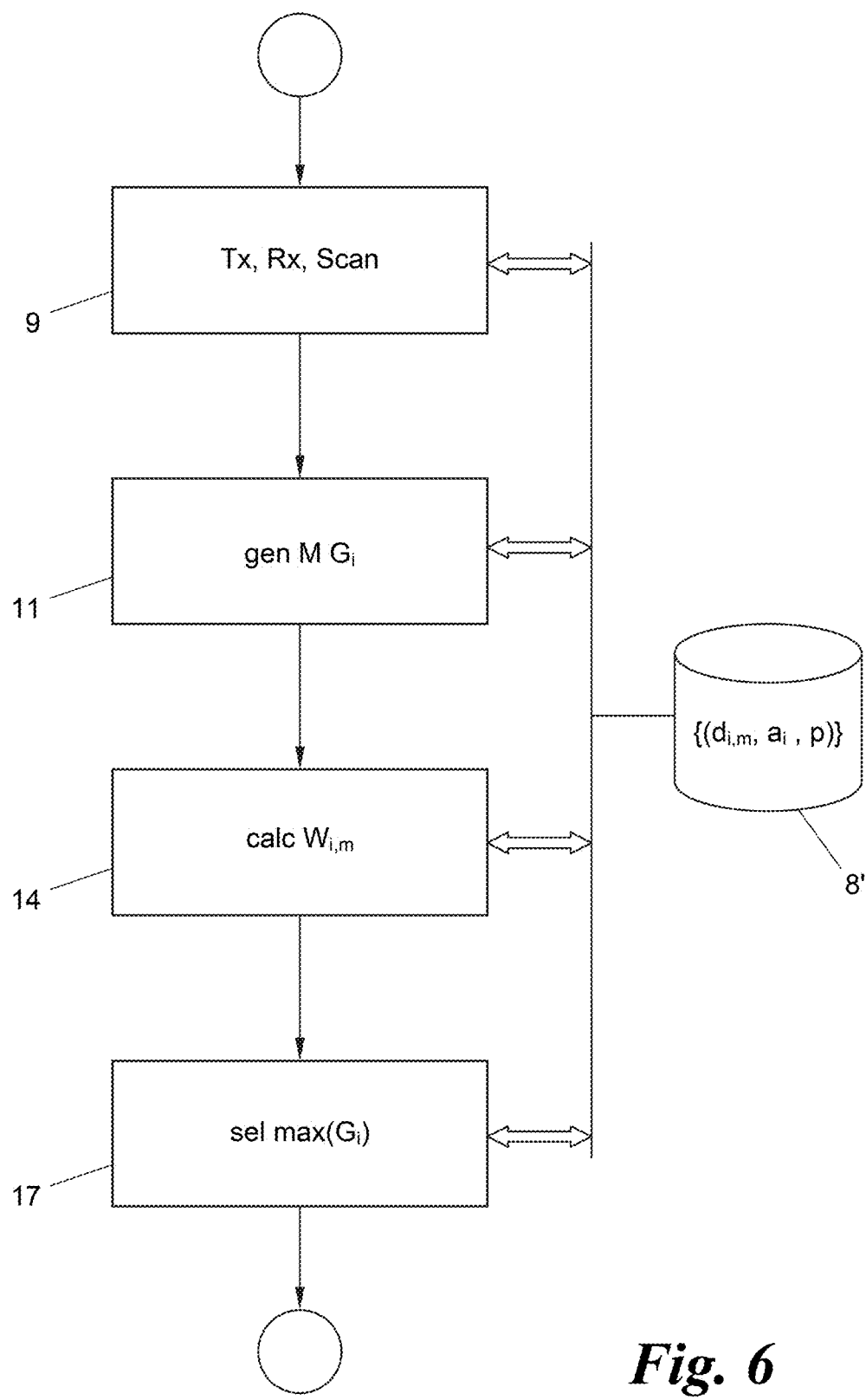
FIG. 6 shows a flow diagram of the method of the disclosed subject matter.

The first step 9 of the method of FIG. 6 relates to the emission, just described, of the sequence $\{S_p\}$ of transmission pulses $S_p$ with varying pulse intervals $\tau_p$ (FIG. 5) and the accompanying receiving and recording of the sequence $\{E_i\}$ of receive pulses $E_i$ and measurement of the receive times $t_{E,i}$ and amplitudes $a_i$ thereof. If the method is performed in a laser scanner 3 with a beam deflection device 6 which scans the laser beam 2 over the surroundings U, for example in adjacent scanning rows 10, as shown later in FIG. 8, such that the temporally successive transmission pulses $S_p$ also give a locally distributed pattern of targets $U_p$ in the surroundings U impinged by the transmission pulses $S_p$, this scanning is performed likewise in step 9.

In a next step 11 a group $G_i$ of M distance measurement value candidates, referred to as "candidate distances" for short, $d_{i,m}$, with m=1 ... M, is now generated for each receive pulse $E_i$. The number M defines the number of MTA zones $Z_r$ which can be resolved, i.e. in which the distance of targets in the surroundings $U_p$ can be measured with correct MTA zone assignment. For this function it is also necessary that the code length L of the pulse distance variation (pulse position modulation) of the transmission pulses $S_p$ is greater than or equal to M.

Each candidate distance $d_{i,m}$ of a group $G_i$ of a receive pulse $E_i$ is based here on another of M transmission pulses $S_p$ preceding the receive pulse $E_i$, i.e. was calculated from the time of flight between the receive time $t_{E,I}$ of this receive pulse $E_i$ and the transmission time $\tau_{S,p-m}$ of the respective transmission pulse $S_{p-m}$ to which reference was made for this candidate distance $d_{i,m}$. This is explained in detail on the basis of the graph of FIG. 7.

Figure 7:
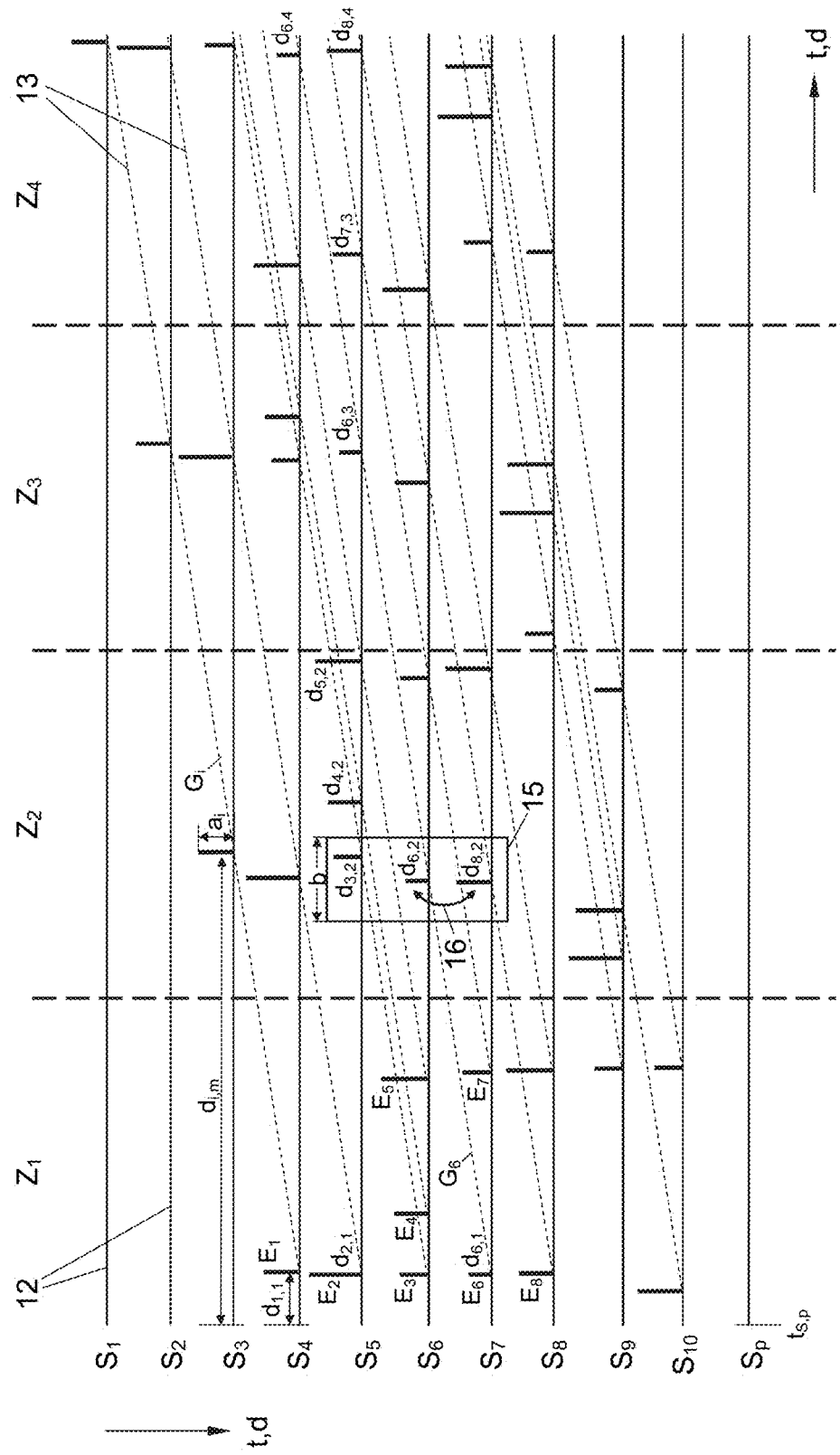
FIG. 7 shows a combined time and assignment graph for transmission and receive pulses within the scope of the method of the disclosed subject matter.

As an example, reference is made to the receive pulse $E_6$ in FIG. 7, which was received directly after the seventh transmission pulse $S_7$. The horizontal, solid lines 12 of the graph of FIG. 7 each represent time axes starting at the transmission time $t_{S,p}$ of a transmission pulse $S_p$—and thus referred to synonymously as: distance axes—on which—similarly to FIG. 5—the receive pulses $E_i$ arriving after one transmission pulse $S_p$ up until the next transmission pulse $S_{p+}$, have been plotted. Once the transmission pulse $S_4$ of the first receive pulse $E_1$ had been received, the transmission pulse $S_5$ was then emitted, then the receive pulse $E_2$ was received, and then the transmission pulse $S_6$ was emitted, whereupon three receive pulses $E_3$, $E_4$, $E_5$ were received before the next transmission pulse $S_7$ was emitted, whereupon the receive pulse $E_6$ which is exemplary here was received, and so on and so forth. The vertical distance between two time or distance axes 12 corresponds in the graph of FIG. 7 to the respective pulse distance $\tau_p$.

The group $G_6$ for the receive pulse $E_6$ is composed in the example of FIG. 7 of M=4 candidate distances $d_{6,1}$, $d_{6,2}$, $d_{6,3}$ and $d_{6,4}$. In the graph of FIG. 7 the groups $G_i$ are each symbolised by a dashed line 13.

The candidate distances $d_{6,1}$ to $d_{6,4}$ are each calculated on the basis of the time difference between the receive time $t_{E,6}$ of the receive pulse $E_6$ and the respective transmission time $\tau_{S,7}$, $\tau_{S,6}$, $\tau_{S,5}$ and $\tau_{S,4}$ of the M=4 previous transmission pulses $S_7$, $S_6$, $S_5$ and $S_4$ to give:

$$d_{6,1} = (t_{E,6} - t_{S,7}) \cdot c/2$$

$$d_{6,2} = (t_{E,6} - t_{S,6}) \cdot c/2$$

$$d_{6,3} = (t_{E,6} - t_{S,5}) \cdot c/2$$

$$d_{6,4} = (t_{E,6} - t_{S,4}) \cdot c/2 \tag{4}$$

As can be seen from FIG. 7, with the generation of the groups $G_i$ in step 11, each candidate distance $d_{i,m}$ is at the same time assigned to the transmission pulse $S_p$ on which it is based, i.e. in the present example:

$$d_{6,1} \rightarrow S_7$$

$$d_{6,2} \rightarrow S_6$$

$$d_{6,3} \rightarrow S_5$$

$$d_{6,4} \rightarrow S_4 \tag{5}$$

This is symbolised in FIG. 7 in that the candidate distances $d_{i,m}$ of the groups $G_i$ are plotted on the time or distance axis 12 of the transmission pulse $S_p$ to which they were assigned, whereby the slanted course of the group lines 13 results.

Each candidate distance $d_{i,m}$, or each 2-tuple $(d_{i,m}, a_i)$ is thus simultaneously assigned a transmission pulse index, generally p, and thus gives the 2-tuple $(d_{i,m}, p)$ or 3-tuple $(d_{i,m}, a_i, p)$ respectively. The amount $\{(d_{i,m}, p)\}$ or $\{(d_{i,m}, a_i, p)\}$ of 2-tuples or 3-tuples generated in step 11 is stored again in the memory 8', for example.

In the next step 14 (FIG. 6), a weighting value $W_{i,m}$ is now determined as follows for each candidate distance $d_{i,m}$ of this amount. The weighting value $W_{i,m}$ is determined on the basis of at least one "pairing" of the respective candidate distance $d_{i,m}$ under consideration to be weighted and at least one "neighbour" candidate distance $d_{j,n}$. The neighbour candidate distances $d_{j,n}$ eligible for the pairings, in the graph of FIG. 7, lie in a "catch region" 15 around the considered candidate distance $d_{i,m}$, which is defined by the following criteria:

(1) The neighbour candidate distance $d_{j,n}$ in the catch region 15 is assigned a transmission pulse $S_{p\pm 1}$ (here: the transmission pulses $S_5$ and $S_7$) which is adjacent to the transmission pulse $S_p$ (here: $S_6$) to which the considered candidate distance $d_{i,m}$ to be weighted (here: $d_{6,2}$) is assigned. A transmission pulse "adjacent" to a transmission pulse $S_p$ is understood here to be both a temporally adjacent transmission pulse $S_{p\pm 1}$, $S_{p\pm 2}$, etc., for example in this case the temporally preceding transmission pulse $S_5$ or the temporally subsequent transmission pulse $S_7$, or a locally adjacent transmission pulse $S_{p\pm x}$ ($x \in N$), as shown in FIG. 8.

Figure 8:
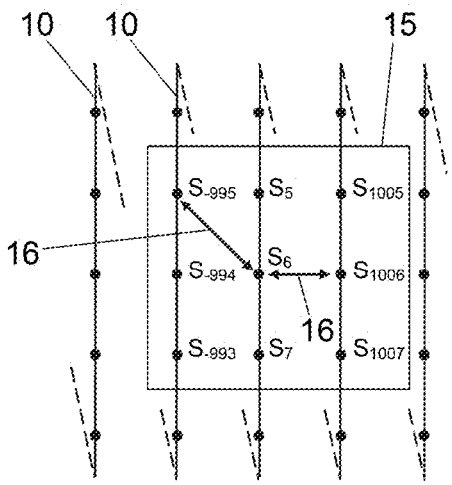
FIG. 8 shows locally adjacent transmission pulses impinging on a target surroundings during laser scanning according to the method of the disclosed subject matter.

FIG. 8 shows a local catch region 15 for the transmission pulse $S_6$ considered here by way of example, which is assigned the exemplary candidate distance $d_{6,2}$, which is exemplary here. In the catch region 15, the transmission pulses $S_{-995}$, $S_{-994}$, $S_{-993}$, $S_5$, $S_7$, $S_{1005}$, $S_{1006}$ and $S_{1007}$ are locally adjacent to the transmission pulse $S_6$ if the catch region 15 has a size of 3×3 transmission pulses $S_p$. Catch regions 15 of other sizes, for example 4×3, 4×4, 5×3, 5×4, 5×5 etc., are also possible. It is clear that transmission pulses $S_p$ from different scanning rows 10 can have a large temporal distance from one another, here for example a distance of 1000 intermediate transmission pulses, and yet can still be locally adjacent to one another in the catch region.

(2) The second criterion for adjacent candidate distances $d_{j,n}$, which thus at the same time defines the catch region 15, lies in that these candidate distances $d_{j,n}$ must be the closest of the candidate distances assigned to a (temporally or locally) adjacent transmission pulse of this kind. In the example of FIG. 7 the candidate distances $d_{2,1}$, $d_{3,2}$, $d_{4,2}$, $d_{5,2}$, $d_{6,3}$, $d_{7,3}$ and $d_{8,4}$ are assigned to the exemplary neighbour transmission pulse $S_5$ (temporal neighbour of the transmission pulse $S_6$ to which the candidate distance $d_{6,2}$ of the receive pulse $E_6$ is assigned), and, of these, the one with the distance value closest to the considered candidate distance $d_{6,2}$ is the candidate distance $d_{3,2}$.

Optionally, it can also be provided in the criterion (2) that candidate distances $d_{j,n}$ which indeed satisfy criterion (2) but lie outside a predefined distance range (synonym: time range) around the considered candidate distance $d_{j,n}$ (here: $d_{6,2}$) are not taken into consideration, A distance range of this kind can be seen in the graph of FIG. 7 as a horizontal width b of the catch region 15 on the time or distance axes 12; all candidate distances $d_{j,n}$ outside the width b of the catch region 15 remain out of consideration throughout the rest of the process.

All of the candidate distances $d_{j,n}$ which satisfy the two above criteria (1) and (2), i.e. qualify for the catch region 15 or thus define it, are taken into consideration in step 14 for the determining of the weighting value $W_{i,m}$ of the considered candidate distance $d_{i,m}$. If just one qualifying candidate distance $d_{j,n}$ lies in the catch region 15, for example if the catch region 15 is defined to be so small that only one neighbour transmission pulse is considered and the width b is small, the weighting value $W_{i,m}$ is then composed exclusively from a single partial weight for the pairing $d_{i,m} \Leftrightarrow d_{j,n}$. If a plurality of qualifying candidate distances $d_{j,n}$ lie in the catch region 15, a partial weight $PW_{i,m,k}$ (k=1 . . . K) is calculated for each of K possible pairings 16 between the considered candidate distance $d_{i,m}$ and the respective candidate distance $d_{j,n,k}$ paired therewith, and the weighting value $W_{i,m}$ of the candidate distance $d_{i,m}$ is given as $$W_{i,m} = \sum_k PW_{i,m,k} \tag{6}$$

with $$PW_{i,m,k} = f_1(d_{i,m}, d_{j,n,k}) \tag{7}$$

or $$PW_{i,m,k} = f_2((d_{i,m}, a_i), (d_{j,n,k}, a_j)) \tag{8}$$

With k=1, i.e. only one pairing 16, the partial weight $PW_{i,m,k}$ corresponds directly to the weighting value $W_{i,m}$. With k>1, the K partial weights $PW_{i,m,k}$ can also for their part be incorporated into the weighting value $W_{i,m}$ in differently weighted form, for example in order to weight diagonal pairings 16 in a square local catch region 15, such as that of FIG. 8, lower than vertical or horizontal pairings 16.

In the function $f_1$ of equation (7), each partial weight $PW_{i,m,k}$ considers the distance difference between the considered candidate distance $d_{i,m}$ and the paired candidate distance $d_{j,n,k}$, i.e.

$$PW_{i,n,k} = EG_{i,n,k} = f_1(d_{i,m}, d_{j,n,k}) = f_{EG}(d_{j,n,k} - d_{i,m}) \tag{9}$$

Figure 9A:
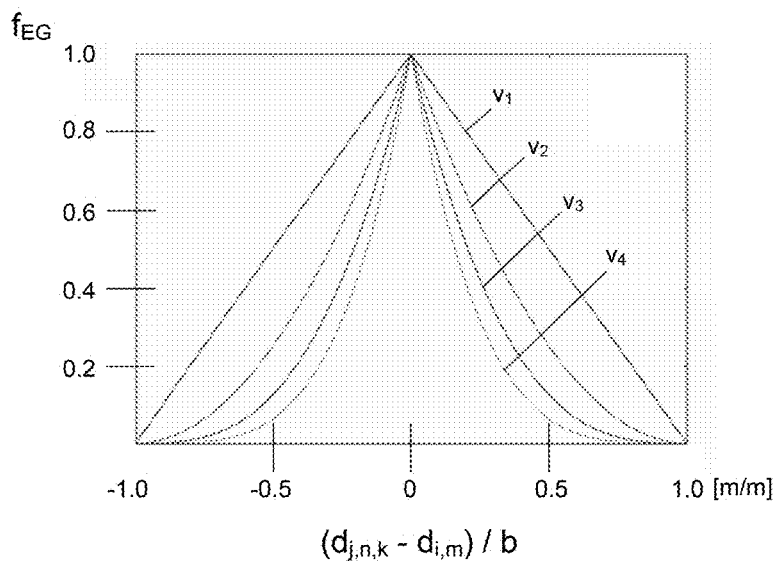
FIGS. 9a and 9b show exemplary weighting functions for distance and amplitude differences within the scope of the method of the disclosed subject matter.

FIG. 9a shows an example of a distance weight function $f_{EG}$ of this kind, which converts the distance difference $d_{j,n,k} - d_{i,m}$ of the candidate pairing 16, plotted on the x-axis of the graph of FIG. 9a and standardised to the catch region width b, into a distance weight $EG_{i,m,k}$, plotted on the y-axis of the graph of FIG. 9a. FIG. 9a shows four different variants $v_1$, $v_2$, $v_3$ and $v_4$ of the distance weight function $f_{EG}$ with linear ($v_1$) or increasingly severe, non-linear drop with greater difference values ($v_1$, $v_2$, $v_3$).

The partial weight $PW_{i,m,k}$—and thus ultimately the weighting value $W_{i,m}$—is optionally and preferably formed additionally on the basis of the amplitude values $a_i$ and $a_j$ of the candidate distances $d_{i,m}$ and $d_{j,n}$ involved in the respective pairing 16, as can be seen by the function $f_2$ in equation (8). To this end the amplitude difference $a_{j,n,k} - a_{i,m}$ of the candidate distances $d_{i,m}$ and $d_{j,n}$ involved in the pairing 16 is firstly calculated with an amplitude weight function $f_{AG}$ to give an amplitude weight $AG_{i,m,k}$ on the following basis:

$$AG_{i,m,k} = f_{AG}(a_{j,n,k} - a_{i,m}) \tag{10}$$

Figure 9B:
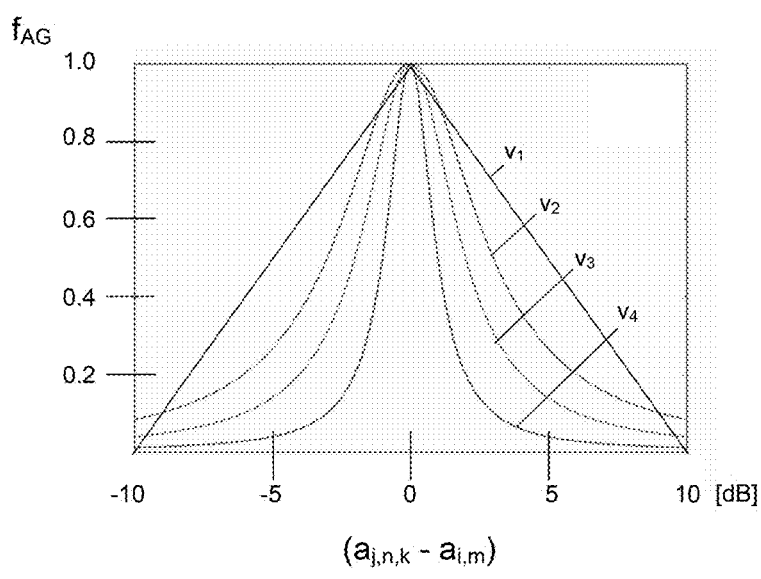

FIG. 9b shows four exemplary variants $v_1$, $v_2$, $v_3$ and $v_4$ of an amplitude weight function $f_{AG}$ of this kind, wherein again the amplitude difference $a_{j,n,k} - a_{i,m}$ is plotted on the x-axis (in dB) and the amplitude weight $AG_{i,m,k}$ is plotted on the x-axis, more specifically in four different variants $v_1$, $v_2$, $v_3$, $v_4$ with (on a logarithmic scale) linear ($v_1$) or increasingly more severe, non-linear drop with greater difference values ($v_2$, $v_3$, $v_4$).

The partial weight $PW_{i,m,k}$ of the $k^{th}$ pairing 16 is then calculated from the sum of any function or preferably a product of the distance weight $EG_{i,m,k}$ and the amplitude weight $AG_{i,m,k}$ on the following basis:

$$PW_{i,m,k} = EG_{i,k} \cdot AG_{i,m,k} \tag{11}$$

The partial weights $PW_{i,m,k}$ are then summed, as explained above, to give the weighting value $W_{i,m}$:

$$W_{i,m} = \sum_k PW_{i,m,k} \tag{6}$$

Once in step 14 (FIG. 6) weighting values $W_{i,m}$ have been calculated in this way for all candidate distances $d_{i,m}$, the candidate distances $d_{i,m}$ in each group $G_i$ which have the maximum weighting value $W_{i,m}$ in the group $G_i$ in question are selected in a subsequent step 17. The candidate distance $d_{i,m}$ selected in a group $G_i$ now represents the distance measurement value $d_i$ of the receive pulse $E_i$ for which the group $G_i$ was generated:

$$d_i = \{d_{i,m} | \max(W_{i,m})\} \tag{12}$$

A distance measurement value $d_i$ which is optimally MTA-zone-correct is thus now determined for each receive pulse $E_i$.

Figure 10A:
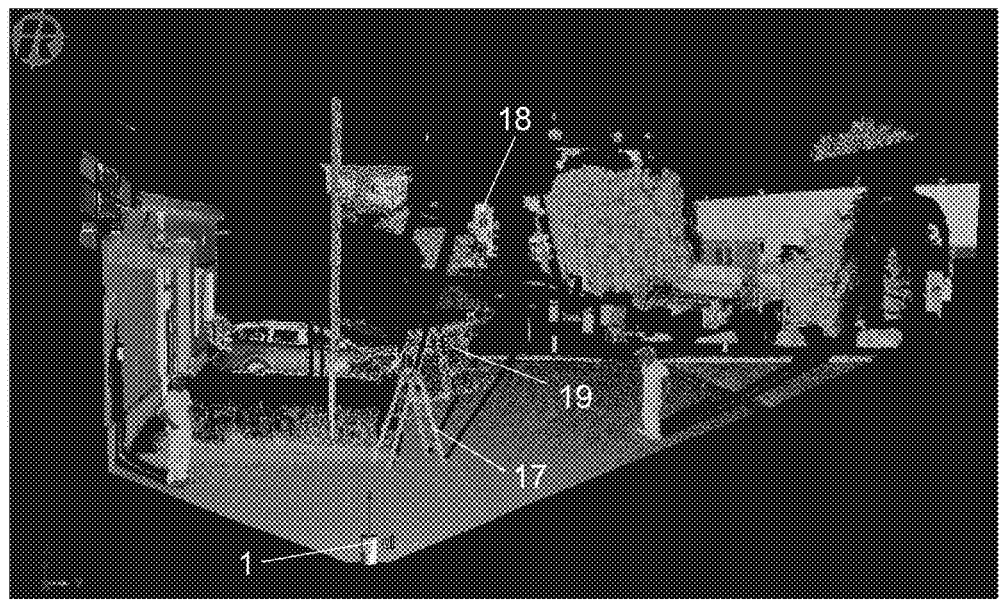
FIGS. 10a and 10b show exemplary 3D point clouds of distance measurement points of a target surroundings, created once with a method according to the prior art (FIG. 10a) and once with a method according to the disclosed subject matter (FIG. 10b).
Figure 10B:
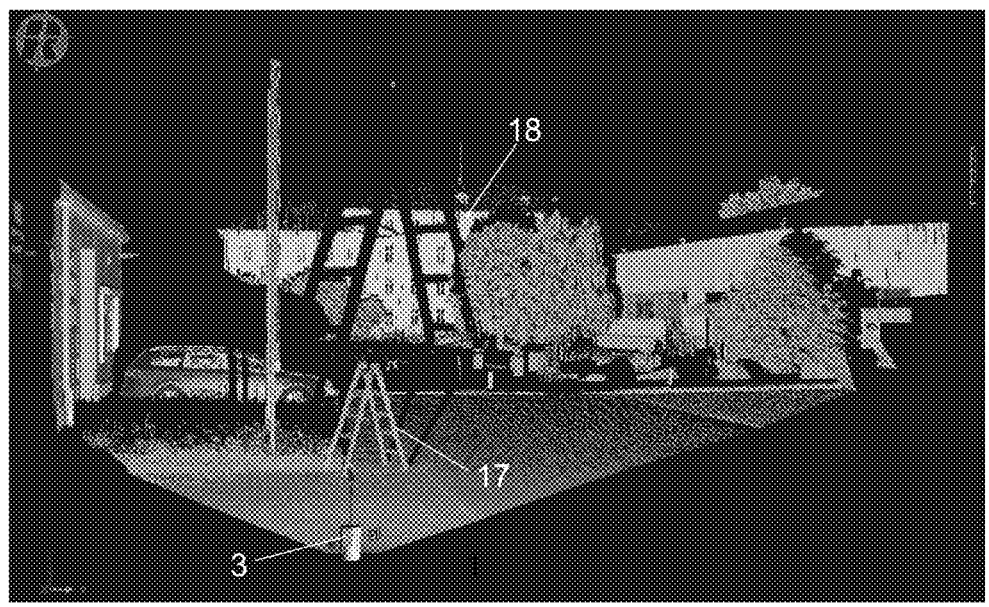

FIG. 10 shows the performance of the presented method on the basis of two examples of a 3D point cloud of distance measurement points of a surroundings area, more specifically once with a conventional laser scanner 1 (FIG. 10a) and once with a laser scanner 3 operating in accordance with the presented method ((FIG. 10b).

It is clear from FIG. 10a that a ladder 17 set up in the MTA zone $Z_1$ leads to massive assignment errors of a building façade 18 located therebehind in the MTA zone $Z_2$, see the artefacts of a façade element 19 incorrectly assigned to the MTA zone $Z_1$ and thus appearing to be in the vicinity of the ladder 17.

In the example of FIG. 10b the described method was performed with weighting values from eight partial weights each formed from distance and amplitude weights for a local 3×3 catch region 15. The method led to a correct assignment of the entire building façade 18 to the second MTA zone $Z_2$ lying far behind the ladder 17. The shadow of the ladder 17 on the building façade 18 is thus clearly discernible, without parts of the building façade 18 having been assigned incorrectly to the MTA zone $Z_1$.

The disclosed subject matter is not limited to the presented embodiments, but instead comprises all variants, modifications and combinations that fall within the scope of the accompanying claims.

What is claimed is:

1. A method for measuring a distance of a targets in surroundings by measuring the time-of-flight of pulses reflected by said targets, said method comprising:
    emitting a sequence of transmission pulses having varying pulse intervals, and receiving at least one receive pulse after each one of two different transmission pulses;
    for each receive pulse generating a group of M candidate distances, each based on a different transmission pulse among M transmission pulses preceding the receive pulse, wherein each candidate distance is assigned to the corresponding transmission pulse on which it is based;
    for each candidate distance determining a weighting value on the basis of at least a closest one of the candidate distances assigned to such a transmission pulse which is adjacent to the transmission pulse to which the candidate distance being considered in this determining process is assigned;
    for each group selecting the candidate distance with a highest weighting value as distance measurement value of the receive pulse for which the group was generated.

2. The method according to claim 1, wherein
    the transmission pulses are emitted with substantially identical amplitude, and for each receive pulse an amplitude thereof is also recorded, and in that the weighting value is formed at least from
    a distance weight based on a distance difference between the candidate distance under consideration and said closest candidate distance, and
    an amplitude weight based on an amplitude difference between the amplitude of that receive pulse for which the group comprising the candidate distance under consideration was generated and the amplitude of that other receive pulse for which the group comprising said closest candidate distance was generated.

3. The method according to claim 2, wherein the distance difference is incorporated non-linearly into the distance weight, wherein a greater distance different results in an underproportionately smaller distance weight, and the amplitude difference is incorporated non-linearly into the amplitude weight, wherein a greater amplitude difference results in an underproportionately smaller amplitude weight.

4. The method according to claim 2, wherein when determining the weighting value said adjacent transmission pulse is a temporally adjacent transmission pulse.

5. The method according to claim 4, wherein the weighting value is determined based at least on
    a closest one of the candidate distances assigned to that transmission pulse which temporally precedes the transmission pulse to which the candidate distance considered for this determination is assigned, and
    a closest one of the candidate distances assigned to that transmission pulse which temporally follows the transmission pulse to which the candidate distance considered for this determination is assigned.

6. The method according to claim 1, wherein when determining the weighting value said adjacent transmission pulse is a temporally adjacent transmission pulse.

7. The method according to claim 6, wherein the weighting value is determined based at least on
    a closest one of the candidate distances assigned to that transmission pulse which temporally precedes the transmission pulse to which the candidate distance considered for this determination is assigned, and
    a closest one of the candidate distances assigned to that transmission pulse which temporally follows the transmission pulse to which the candidate distance considered for this determination is assigned.

8. The method according to claim 1 for scanning a surroundings area, wherein the transmission pulses are emitted in their temporal sequence to locally different targets in the surroundings, wherein
    in the determination of the weighting value said adjacent transmission pulse is a transmission pulse locally adjacent in respect of the targets in the surroundings.

9. The method according to claim 8, wherein a plurality of locally adjacent transmission pulses are used for the determination of the weighting value,
    in that the weighting value is formed from partial weights, and
    in that each partial weight is based on a closest one of the candidate distances assigned to the respective locally adjacent transmission pulse.

10. The method according to claim 9, wherein the transmission pulses are emitted with substantially identical amplitude and for each receive pulse the amplitude thereof is also recorded, and
    in that each partial weight is formed at least from
    a distance weight based on ache distance difference between the candidate distance under consideration and the aforementioned respective closest candidate distance, and
    an amplitude weight based on an amplitude difference between the amplitude of that receive pulse for which the group comprising the candidate distance under consideration was generated, and the amplitude of that other receive pulse for which the group comprising the aforementioned respective closest candidate distance was generated.

11. The method according to claim 10, wherein the distance difference is incorporated non-linearly into the distance weight, wherein a greater distance difference results in an underproportionately smaller distance weight, and in that the amplitude difference is incorporated non-linearly into the amplitude weight, wherein a greater amplitude difference results in an underproportionately smaller amplitude weight.

12. The method according to claim 1, wherein when determining the weighting value only the closest candidate distances which lie within a predefined distance range (b) around the considered candidate distance are taken into consideration.

13. The method according to claim 1, wherein when generating the group said M candidate distances are based on M transmission pulses directly preceding the receive pulse.

14. The method according to claim 1, wherein, during emission, the pulse distances are varied in accordance with a repeating code, the code length of which is greater than or equal to M.

15. The method of claim 1, wherein the pulses are laser pulses.

* * * * *